E. I. DEUTSCH.
MOTOR CONTROLLER.
APPLICATION FILED JULY 26, 1915.

1,309,797.

Patented July 15, 1919.

Inventor
E. I. Deutsch
by
Attorney

UNITED STATES PATENT OFFICE.

EDWARD I. DEUTSCH, OF NORTH NORWOOD, OHIO, ASSIGNOR TO ALLIS-CHALMERS MANUFACTURING COMPANY, OF MILWAUKEE, WISCONSIN, A CORPORATION OF DELAWARE.

MOTOR-CONTROLLER.

1,309,797.　　　　Specification of Letters Patent.　　Patented July 15, 1919.

Application filed July 26, 1915. Serial No. 42,443.

*To all whom it may concern:*

Be it known that I, EDWARD I. DEUTSCH, a citizen of the United States, residing at North Norwood, in the county of Hamilton and State of Ohio, have invented a certain new and useful Improvement in Motor-Controllers, of which the following is a specification.

This invention relates in general to control devices for electric circuits and has particular relation to devices of such a character as to be specially adapted for use in controlling the primary and secondary circuits of induction motors.

In operating induction motors of the wound secondary type, it is highly desirable, in order to protect the secondary windings against the passage of dangerously heavy currents during the starting of the motor, that means be provided for preventing the closure of the primary circuit unless a maximum amount of resistance is included in the secondary circuit.

It is an object of this invention to provide an improved controlling device for induction motors, comprising coöperative primary and secondary control elements that function to accomplish the desired control and, at the same time, fully protect the motor.

It is a further object of this invention to provide a control apparatus of this character insuring that the primary control element can be operated to closed position only when the secondary control element is in off or resistance-in position, that the secondary control element is positively held in running position while the primary element is in closed position, that the secondary control element is permitted to return to off-position when the primary element is operated to open position, and that, if the secondary control element fails to return to off position, on the operation of the primary element to open position, subsequnt operation of the primary element to closed position may be prevented until the secondary control element is manually operated to off position.

These and other objects are attained by this invention, the various novel features of which will appear from the description and drawings, disclosing one embodiment of such invention, and will be particularly pointed out in the claims.

Figure 1:
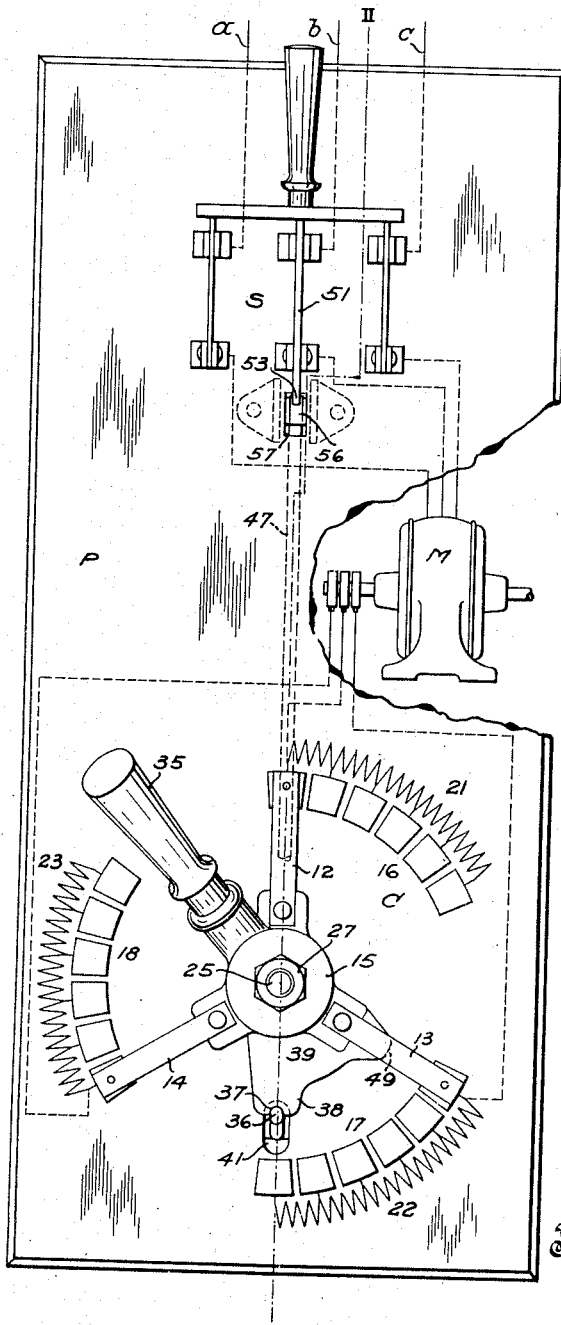

In the accompanying drawings:

Figure 1 is a partial diagrammatic view showing an induction motor and the control devices therefor, the primary and secondary control elements being shown in elevation mounted on a control panel.

Figure 2:
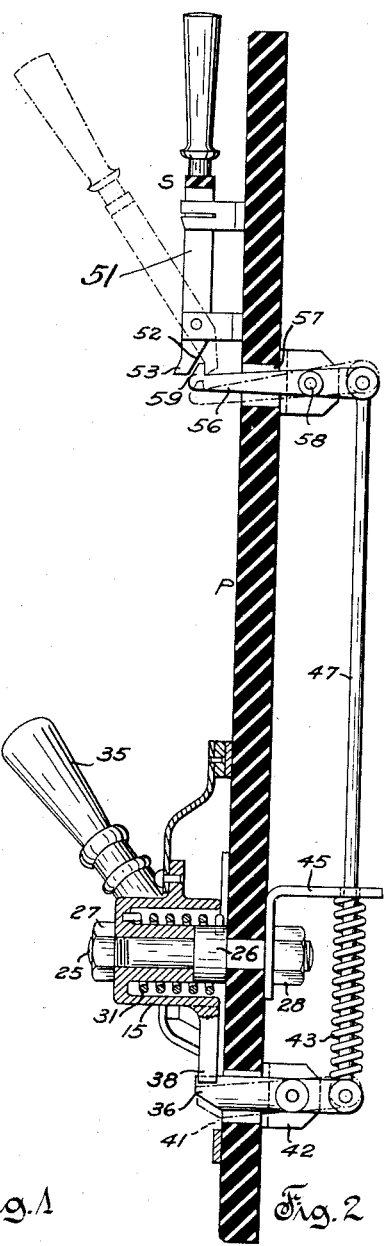

Fig. 2 indicates a section on the line II—II of Fig. 1.

In accordance with the illustrated disclosure, an induction motor M, here shown as being of the three-phase type, is supplied from the mains $a$, $b$, $c$, a three-pole switch S being inserted for controlling the primary circuit. A controller C, of the three-phase type, is connected in the secondary circuit of the motor, the controller comprising three conducting arms 12, 13 and 14, electrically connected through a supporting element 15 and operative to engage sets of contact segments 16, 17 and 18, respectively, here shown as being mounted on a control panel P, to short-circuit sections of the resistance elements 21, 22 and 23, respectively. The controller is shown as being in running or resistance-out position, that is, all sections of the resistance elements 21, 22 and 23 are short-circuited by the arms 12, 13 and 14, respectively.

The supporting element 15 is disclosed as being pivotally mounted on a bolt or stud 25 and bearing on a relatively fixed pivot block 26 associated with the stud 25, nuts 27 and 28 being used for securing the stud in position relatively to the panel P and the support 15. The spring 31, here shown as being of the helical type and disposed within an interior cup-shaped portion of the support 15, is secured at one end to the block 26 and at the other end to the support 15 and serves to bias and return the controller to off position, that is, the position in which the maximum amount of resistance is included in the secondary circuit of the motor. A handle 35 is secured to the supporting element 15 for operating purposes.

An end portion of a latch 36 is engageable in a notch 37 of a cam extension 38 of a portion 39 integral with or secured to the support 15. The latch 36 passes through an opening 41 in the panel P and is pivoted on a support 42 secured to the rear side of the panel, a spring 43, bearing at one end on a fixed abutment 45 and at the other end on the rear end of the latch 36, serves to urge the latter into a position wherein the forward end portion thereof engages in the recess 37 when the controller C is in the position shown in Fig. 1. The abutment 45 may be of any suitable character, being here shown as an angle piece secured in position relatively to the panel P by means of the bolt 25 and nut 28.

The latch 36 may be positively operated against the action of the spring 43, by manipulation of a rod 47 pivotally secured at one end to the rear end of the latch, and preferably passing through an opening in the abutment 45 and serving as a guide for the spring 43.

The controller C is held in the position shown in the drawings by engagement of the latch 36 in the recess 37, the latch being held in such position by the spring 43. On tripping of the latch 36 through operation of the rod 47, the spring 31 acts to return the controller to off position, that is, the position in which the maximum amount of resistance is included in the secondary circuit. As the controller returns to off position, a cam extension 49 on the part 39, associated with the supporting element 15, engages the latch 36 and forces the same to a position corresponding to that shown in dotted lines Fig. 2. In moving to this latter position, the latch actuates the rod 47 and compresses the spring 43.

The middle blade 51 of the primary switch S is provided, at its lower end beyond the pivot and on the edge adjacent the panel P, with a cam portion 52, and at its opposite edge with a cam extension 53. A latch 56 passes through an opening 57 in the panel P and is pivoted at 58 to an element supported on the rear side of the panel. The forward end of the latch 56 is provided with a hook-shaped extension 59, adapted, in one of its operative positions, to lie in the path of the cam portions 52 and 53 of the switch blade 51. The rear end of the latch is pivotally secured to the rod 47 so as to provide for simultaneous movement of the latches 56 and 36 in the same angular direction. The normal position of the latch 56, that is, the position to which it is urged by the spring 43 and the rod 47, is shown in full lines, and the position occupied by this latch, when the latch 36 is in the position to which it is moved by the cam portions 49, is shown in dotted lines.

In accordance with the intended operation of the control apparatus, considering the primary and secondary elements in the positions shown in the drawings, with the forward end of the latch 36 engaged in the recess 37 to hold the controller C in running position and the hook-shaped extension 59 of the latch 56 lying in the path of cam portion 52 of the blade 51, when the primary switch S is opened, the cam portion 52 engages a cam surface on the portion 59 of the latch 56, actuating the latter to such position as to cause removal of the latch 36 from the recess 37, through the operating rod 47. On such tripping of the latch 36, through opening of the primary switch S, the spring 31 acts to return the controller C to off position. With the primary and secondary control elements in these latter positions, and the latches 36 and 56 in positions corresponding to the dotted line showing of Fig. 2 and being held therein by the action of the cam projection 49 on the latch 36, the motor can be readily started again by closure of the primary switch, there being no obstruction to such operation.

However, were the controller C to be left at any intermediate position, the spring 43 would urge the latch 36 to occupy the recess between the cam portions 38 and 49 and would cause the latch 56 to be operated to the position shown in full lines in Fig. 2 wherein the hook-shaped extension 59 would engage over the cam extension 53 of the switch blade 51, the latter being, at this time, in open position, as indicated in dotted lines. This latter engagement between the hook-shaped portion 59 and the extension 53 would prevent subsequent operation of the primary switch to closed position until the controller C were moved to such position that the cam portion 49 would move the latches 36 and 56 into their dotted line positions.

Again, if for any reason the controller C fails to move from on or resistance-removed position, indicated in Fig. 1, on tripping of the latch 36 through the actuation of the latch 56 on the opening of the primary switch, the latch 36, on the passage of the cam-shaped lower end of the switch blade 51 by the latch 56, is forced back into the recess 37 and the hook-shaped extension 59 of the latch 56 passes over the cam extension 53 on the switch blade 51, thus holding the primary switch against subsequent operation and giving warning that the controller is not in proper position for starting the motor. The controller C can then be positively returned to starting or resistance-in position, and the primary switch S can be closed to start the motor again.

It will be apparent that, in accordance with this invention, the primary and secondary elements are so interconnected as to permit any desirable operation and to prevent any undesirable operation in controlling the motor.

It should be understood that it is not desired that the invention, as claimed, be limited to the exact details of construction shown and described, for obvious modifications will occur to a person skilled in the art.

It is claimed and desired to secure by Letters Patent:

1. In a system for controlling alternating current induction motors of the type having primary and secondary windings, a controlling switch adapted to be connected in the circuit of the primary winding, a controller adapted to be associated with the circuit of the secondary winding, said controller being operative to insert resistance in and remove resistance from the circuit of said secondary winding and being biased to resistance-in position, and latch means associated with said primary switch and said secondary controller and operative to hold said secondary controller in resistance-removed position and to prevent operation of said primary switch, said latch means being operable by said primary switch to release said secondary controller.

2. In a system for controlling alternating current induction motors of the type having primary and secondary windings, a controlling switch adapted to be connected in the circuit of said primary winding, a controller adapted to be associated with the circuit of said secondary winding, said controller comprising resistance elements and means adapted to cause the insertion of said resistance elements in and the removal of said elements from the circuit of said secondary winding, said means being biased to a position in which maximum resistance is included in the secondary circuit, and latch means operative in one position to retain said secondary controller in resistance-removed position and operative, when said secondary controller is in other than full resistance-in position and said primary switch is open, to prevent closure of said primary switch.

3. In a system for controlling alternating current induction motors of the type having primary and secondary windings, a controlling switch adapted to be connected in the circuit of the primary winding, a controller adapted to be associated with the circuit of the secondary winding, said controller being operative to insert resistance in and remove resistance from the circuit of said secondary winding, and latch means operative when said primary switch is closed to hold said secondary controller in full resistance-removed position and to permit opening of said primary switch and operative to prevent closure of said primary switch when said controller is in other than full resistance-in position and said primary switch is open, said latch means being operable by said primary switch during its movement to open position to release said secondary controller.

4. In a system for controlling alternating current induction motors of the type having primary and secondary windings, a controlling switch adapted to be connected in the circuit of the primary winding, a controller adapted to be associated with the circuit of the secondary winding, said controller being operative to insert resistance in and remove resistance from the circuit of said secondary winding, and latch means operative to hold said controller in resistance-removed position and to hold said primary switch against closure, said latch means being operable by said primary switch during its opening movement to release said controller.

5. In a system for controlling alternating current induction motors of the type having primary and secondary windings, a controlling switch adapted to be connected in the circuit of said primary winding, a controller adapted to be associated with the circuit of said secondary winding, said controller being operative to insert resistance in and remove resistance from the circuit of said secondary winding, a latch operative to hold said controller in resistance-removed position, a second latch associated with said first latch and operative to hold said primary switch in inoperative position and operable by said primary switch to actuate said first latch to released position to permit the operation of said controller to resistance-in position.

6. In a system for controlling alternating current induction motors of the type having primary and secondary windings, a controlling switch adapted to be connected in the circuit of said primary winding, a controller for the circuit of said secondary winding, said controller comprising resistance elements and means adapted to insert said elements in or remove the same from the circuit of said secondary winding, said means being biased to a position in which maximum resistance is included in said secondary circuit, a latch for retaining said means in such position that said resistance elements are effectively removed from said secondary circuit, a second latch operatively associated with said first latch and rendered operative by said primary switch to trip said first latch to permit said secondary controller to move to resistance-in position, said second latch coöperating with said primary switch to prevent closure of said switch when said first latch is operative to hold said controller in resistance-removed position.

7. In a system for controlling alternating current induction motors of the type having primary and secondary windings, a controlling switch adapted to be connected in the circuit of said primary winding, a controller operative to insert resistance in or to remove resistance from the circuit of said secondary winding, a panel, operating means for said primary switch and said secondary controller comprising parts mounted on the front side of said panel, latches coöperative with the operating means for said primary switch and said secondary controller at the rear side of said panel, means for connecting said latches to cause simultaneous movement thereof, and resilient means for biasing said latches to one of their operative positions, one of said latches being operative to hold said primary switch against closure and another of said latches being operative to hold said controller in resistance-removed position.

8. In combination, a controlling device having a movable part biased toward an initial position, a switch, a latch operatively associated with said controlling device, and a second latch operatively associated with said switch and said first latch, in one position said first latch holding said controlling device against movement from a position other than its initial position and said second latch being operable by said switch to cause release of said first latch or operative to restrain operation of said switch, and in another position said latches permitting operation of said switch and said controlling device.

9. In apparatus for controlling the operation of electric motors, a line switch, a controller connectible to insert resistance in and remove resistance from a circuit of said motor and being biased to resistance-in position, and latch means associated with said switch and said controller and operative to hold said controller in resistance-removed position and to prevent operation of said switch, said latch means being operable by said switch to release said controller.

10. In apparatus for controlling the operation of electric motors, a line switch, a controller comprising resistance elements and means connectible to cause the insertion of said resistance elements in and the removal thereof from a circuit of said motor, said means being biased to a position in which maximum resistance is included in said circuit, and latch means operative in one position to retain said controller in resistance-removed position and operative, when said controller is in other than full resistance-in position and said switch is open, to prevent closure of said switch.

11. In apparatus for controlling electric motors, a controlling switch connectible in a circuit of said motor, a controller connectible to insert resistance in and remove resistance from a circuit of said motor, and latch means operative when said switch is closed to hold said controller in full resistance-removed position and to permit opening of said switch and operative to permit closure of said switch only when said controller is in full resistance-in position and said switch is open, said latch means being operable by said switch during its movement to open position to release said controller.

12. In apparatus for controlling electric motors, a controlling switch connectible in a circuit of said motor, a controller connectible to insert resistance in and remove resistance from a circuit of said motor, and latch means operative to hold said controller in resistance-removed position and to hold said switch against closure, said latch means being operable by said switch during its movement to release said controller.

13. In apparatus for controlling electric motors, a controlling switch, a controller connectible to insert resistance in and remove resistance from a circuit of said motor, a latch operative to hold said controller in resistance-removed position, a second latch associated with said first latch and operative to hold said switch in inoperative position and operable by said switch to actuate said first latch to released position to permit the operation of said controller to resistance-in position.

14. In apparatus for controlling electric motors, a controlling switch, a controller comprising resistance elements and means connectible to insert said elements in or remove the same from a circuit of said motor, said means being biased to a position in which maximum resistance is included in said circuit, a latch for retaining said means in such position that said resistance elements are effectively removed from said circuit, a second latch operatively associated with said first latch and rendered operative by said switch to trip said first latch to permit said controller to move to resistance-in position, said second latch coöperating with said switch to prevent closure of said switch when said first latch is operative to hold said controller in resistance-removed position.

15. In apparatus for controlling electric motors, a switch, a controller connectible to insert and remove resistance from a circuit, a panel, operating means for said switch and said controller comprising parts mounted on the front side of said panel, latches coöperative with the operating means for said switch and said controller at the rear side of said panel, means for connecting said latches to cause simultaneous movement thereof, and resilient means for biasing said latches to one of their operative positions, one of said latches being operative to hold said switch against closure and another of said latches being operative to hold said controller in resistance-removed position.

16. In motor control apparatus, a line switch, a controller, means for biasing the controller to one position, and means for holding the controller in another position and by its movement to holding position preventing closure of said switch with the controller in the second-named position.

17. In motor control apparatus, a line switch, a controller, means for biasing said controller to one position, means for preventing closure of said switch, and means adapted to hold said controller in another position and by its movement render said preventing means effective.

18. In motor control apparatus, a line switch, a controller, means for biasing said controller to one position, means for preventing closure of said switch, and means adapted to hold said controller in another position and by its movement render said preventing means effective or ineffective dependent upon the position of said controller.

In testimony whereof the signature of the inventor is affixed hereto.

EDW. I. DEUTSCH.